US011521431B2

(12) United States Patent
Williams

(10) Patent No.: US 11,521,431 B2
(45) Date of Patent: Dec. 6, 2022

(54) VEHICLE WINDOW OR PANEL COVERING WITH SERVICE LEVEL INDICATOR

(71) Applicant: Toyota Motor Engineering & Manufacturing North America, Inc., Plano, TX (US)

(72) Inventor: Clinton J. Williams, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 37 days.

(21) Appl. No.: 17/158,191

(22) Filed: Jan. 26, 2021

(65) Prior Publication Data

US 2022/0237953 A1  Jul. 28, 2022

(51) Int. Cl.
*B60W 40/12* (2012.01)
*G07C 5/00* (2006.01)
*B60W 50/00* (2006.01)

(52) U.S. Cl.
CPC ............ *G07C 5/006* (2013.01); *B60W 40/12* (2013.01); *B60W 50/0098* (2013.01); *B60W 2510/244* (2013.01); *B60W 2540/045* (2020.02)

(58) Field of Classification Search
CPC ............ B60W 40/12; B60W 50/0098; B60W 2540/045; B60W 2510/244; G07C 5/006
See application file for complete search history.

(56) References Cited

U.S. PATENT DOCUMENTS

| 6,448,740 | B1 | 9/2002 | Kirkpatrick |
| 6,739,375 | B2 | 5/2004 | Schlecht et al. |
| 6,811,201 | B2 | 11/2004 | Naik |
| 7,469,916 | B2 | 12/2008 | Watson |
| 7,884,569 | B2 | 2/2011 | Ward |
| 8,487,752 | B2 | 7/2013 | Mueller et al. |
| 8,590,593 | B2 | 11/2013 | Kamioku et al. |
| 8,827,347 | B2 | 9/2014 | Snider |
| 8,946,924 | B2 | 2/2015 | Pessina |
| 9,216,659 | B2 | 12/2015 | Kim et al. |
| 9,712,741 | B2 | 7/2017 | Kothari |
| 9,895,992 | B2 | 2/2018 | Kim et al. |

(Continued)

FOREIGN PATENT DOCUMENTS

| JP | 2016118403 A | 6/2016 |
| JP | 6689907 B2 | 4/2020 |
| KR | 100996248 B1 | 11/2010 |

*Primary Examiner* — Peter D Nolan
*Assistant Examiner* — Ce Li Ll
(74) *Attorney, Agent, or Firm* — Christopher G. Darrow; Darrow Mustafa PC

(57) ABSTRACT

A service level indicator system for a vehicle includes one or more sensor that provides one or more of a battery charge level, fuel fill level, oil fill level, and tire pressure level to a control system that instructs the actuation of at least one of a sun visor, shade, and tonneau cover is positioned to generate a message that is readily understood by the vehicle's operator but is ambiguous to other viewers. These components require no power after actuation and do not draw attention to any message they transmit. The position can identify the level that is deficient, and the degree of the deficiency using one or a plurality of the vehicle's components. The entire message is viewable from at least the driver's side of the vehicle and can be at least partially received from any angle of approach to the vehicle.

19 Claims, 1 Drawing Sheet

(56) References Cited

U.S. PATENT DOCUMENTS

| | | |
|---|---|---|
| 10,040,361 B2 | 8/2018 | Clarke et al. |
| 10,328,854 B2 | 6/2019 | Ryuta et al. |
| 10,569,702 B2 | 2/2020 | Baker et al. |
| 2005/0264022 A1 | 12/2005 | Suzuki et al. |
| 2006/0190149 A1* | 8/2006 | LaPant .................... G01F 25/20 702/182 |
| 2009/0250964 A1 | 10/2009 | Demma et al. |
| 2015/0022994 A1 | 1/2015 | Delia et al. |
| 2018/0017430 A1* | 1/2018 | Aghili ....................... G01F 9/00 |
| 2020/0005564 A1 | 1/2020 | Coburn et al. |

* cited by examiner

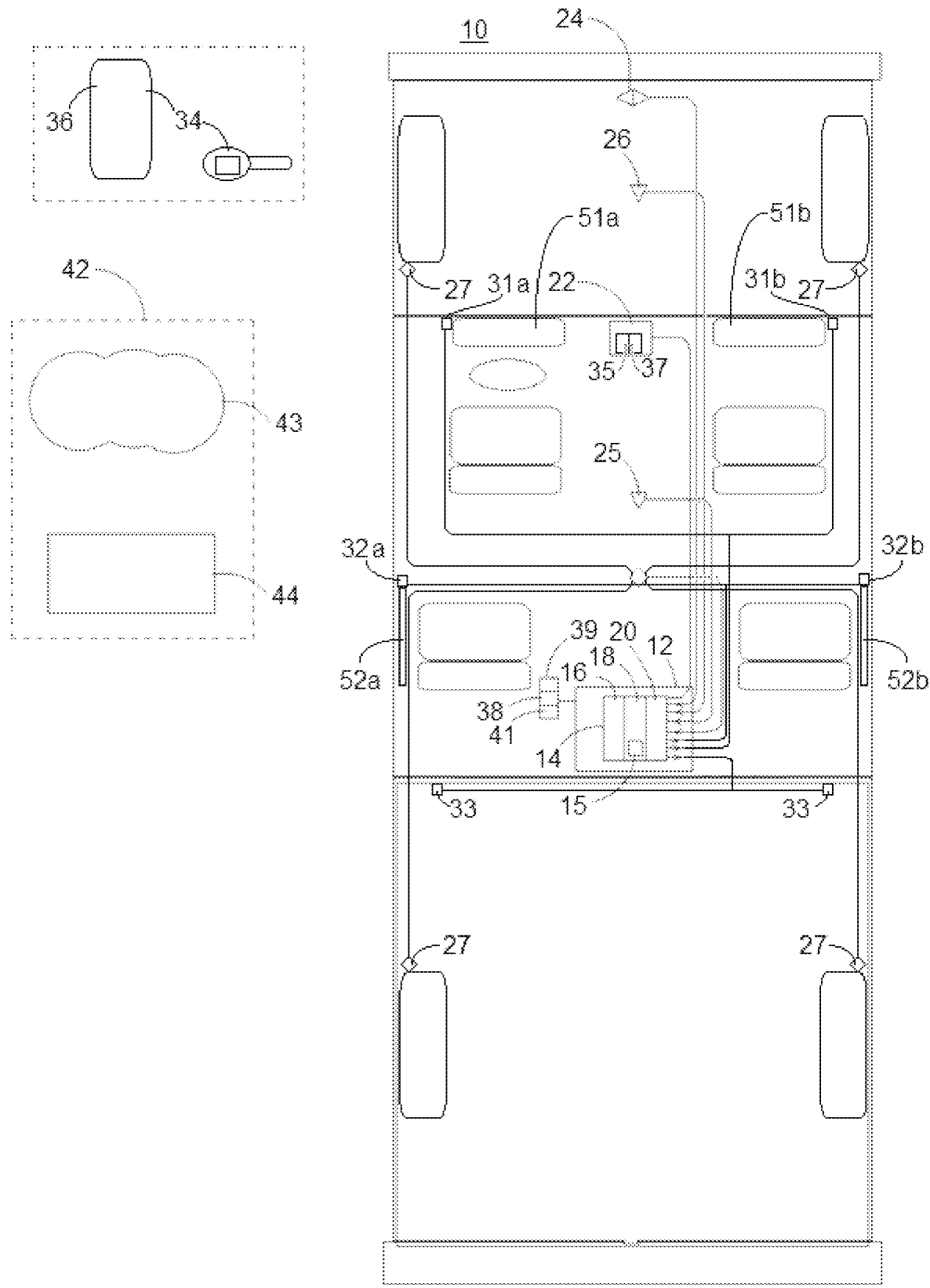

VEHICLE WINDOW OR PANEL COVERING WITH SERVICE LEVEL INDICATOR

TECHNICAL FIELD

The present disclosure generally relates to a device incorporated in a vehicle to inconspicuously provide an indication of the state of charge (SOC), fluid levels, pressure level, or other service level indicator that is visible from the outside of the vehicle for alerting a driver to a low level while approaching the vehicle by the position of a window visor, a sunshade, or a tonneau cover.

BACKGROUND

In the field of electric vehicles, different systems on a vehicle's exterior have been established to indicate the state of charge (SOC) of the vehicle's battery. For example, a charge indicator light has been incorporated on the vehicle's side view mirror; an antenna may use several light indicator segments that include an light emitting diode (LED) array to provide an indication of varying levels of charge regarding the vehicle and other charging operation information; a vehicle's exterior lights may be activated in a manner that provides various status indications concerning the SOC of the vehicle's battery, where the exterior lights may flash in a pattern that indicates the level of charge; and a windshield wiper position can be employed as the charge indicator.

Many vehicles have rotatable sun visors, roller shades, and/or tonneau covers; however, none of these systems have exploited these components to provide an indication concerning the battery, fuel, fluid, or pressure levels when the vehicle is in park or is being charged or otherwise serviced. By using the common components visible to a vehicle's exterior, a discrete level indicator is possible, where the status of the vehicle can be broadcast in a manner that is understood by the driver or operator without that status being obvious to others in the surrounding area. In this manner, knowledge of, for example, a dead battery, flat tire, disabled engine, low state of charge (SOC) or other problems can be imparted to the operator such that it would not be appreciated by another that the vehicle may be impaired, or that the vehicle's operator appears to have been absent for an extended time, leading to an unsafe situation for the operator or is advantageous for a would-be thief. Therefore, a discrete, subtle, and/or disabling service level indicator viewable on the outside of a vehicle is desirable, where a subtle mode of information transmission is possible using a signal provide by the position of one or more vehicle components that typically are randomly positioned, such as sun visors, roller shades, and/or tonneau cover, alone or in a combination. Such a message would transmit a warning to the operator without alerting others or requiring a consumption of a limited and possibly deficient power.

SUMMARY

This section provides a general summary of the disclosure and is not a comprehensive disclosure of its full scope or all its components.

In various aspects, the present teachings provide a service level indicator system that provides a message to an authorized operator, for example, the owner of a vehicle, where, upon approach to the vehicle, a warning concerning the battery charge level or SOC, fuel fill level, fluid fill level, and/or tire pressure level can be appreciated, such that appropriate action can be taken by the approaching operator without that knowledge of a problem being apparent to others. In this manner, using a sun visor, shade, tonneau cover, or some combination of these common vehicle components, there can be no suggestion to one with nefarious intent of a compromised vehicular state that could provide some window to the misfortune of the vehicle's owner or authorized operator.

In other aspects, the present teachings provide a method for providing a message to a vehicle's operator, concerning the vehicles state without that signal being readily appreciated by others. The vehicles components and the parameters employed by these components can be established by the appropriate individual such that the signal is one that is easily apparent to the vehicle's operator but not noticeable by others. The mode and combination of positions displayed by one or more sun visor, shade and/or tonneau cover, can be uniquely known to and can be uniquely set by the operator or someone on the operator's behalf.

Further, the present disclosure provides an improved system and method relative to presently available systems by the requirement of little power to monitor the level and actuate the positional change. Existing systems typically continue to drain power for the flashing of a light or of sounding of an alarm while broadcasting the fact of a problem to all in the vehicles surrounding area. Hence the information that is provided to observers that are intent on monitoring the vehicle is shielded from them by the service level indicator system and the possible jeopardy to the driver or vehicle is diminished significantly.

In other aspects, the present teachings provide for a vehicle including a service level indicator system that adjusts an angle or translational position of a retractable visor, shade, or cover to reflect the status of a battery charge level, tire pressure level, fuel fill level, fluid fill level or other conditions that require nearly immediate or immediate attention, where this level is conveyed to a degree or manner that it is readily visible from outside the vehicle at a distance that allows a response before the driver or passengers are immediately upon the vehicle. For example, the message can be received as the operator approaches the vehicle but cannot be perceived as a warning to others in the vicinity of the vehicle. The sun visor, shade, or tonneau cover is placed at a discretely adjusted angle, length, height, or any perceivable combination in one or more of the respective components such that alone, or in combination, the driver understands the incremental positional correlation that indicates the needed service.

BRIEF DESCRIPTION OF THE DRAWINGS

The present teachings will become more fully understood from the detailed description and the accompanying drawing, wherein:

FIG. 1 is an exemplary schematic view illustrating a pickup truck with a service level indicator system having a plurality of sensors to detect state of charge (SOC) for an electric vehicle or a battery charge for an internal combustion engine (ICE) vehicle, a fuel fill level, an oil fill level, and tire pressure levels in a system configured to provide a subtle personal signal to the truck operator.

It should be noted that the FIGURE set forth herein is intended to exemplify the general characteristics of the methods, algorithms, and devices among those of the present technology, for the purpose of the description of certain aspects. This FIGURE may not precisely reflect the characteristics of any given aspect and is not necessarily intended to define or limit specific embodiments within the scope of this technology.

DETAILED DESCRIPTION

The present technology generally provides a service level indicating system that provides a discrete discreet positional signal to an authorized operator or owner of a vehicle, where upon approach of the vehicle, a warning is conveyed only to the operator concerning critical levels required for functioning of the vehicle such as, but not limited to, its battery charge level or SOC, or for an ICE vehicle, its fuel fill level, fluid fill level, and/or any vehicle's tire pressure level or any other status required for safe driving of the vehicle. In this manner, the operator can decide upon an appropriate action while approaching the vehicle without that inconvenience of the problem being perceived by others in the vicinity of the vehicle. In this manner, using one or more components selected from sun visors, shades, tonneau covers, or some combination of these common vehicle components, a message is conveyed that cannot suggest to one with nefarious intent of a compromised vehicular state, which could provide some window for committing an illegal act to the operator or vehicle. Furthermore, once transmitted to the feature, no or minimal additional power is needed to convey or adjust the message. The position is one that would typically result from the driver or passengers leaving the component in a position that was convenient for the occupant at any given time and it was not returned to a limited position, hence, causing no curious signal to an observer.

The vehicle component that is used to convey the message should be one that does not cause potential damage by its movement and would not attract attention by being in the indicative position. For example, a windshield wiper can cause damage to itself or the windshield when grit, for example, from sand, dust, or hard plant matter is present when it is moved to its messaging position without the presence of rain or washing fluid to lubricate its motion. The position of the wipers in a non-off position or one where both windshield wipers are not in a harmonious position common to their function becomes an oddity that can attract the attention of others. An exterior mirror cannot be positioned in a fashion where its orientation can be observed and understood from a relatively wide range of viewing angles, and for this reason, the mirrors position is not a preferable choice for the discreet message to the operator.

In another aspect, the present teachings provide a method for an operator to establish a subtle and singular signal concerning a vehicle's state without that signal being common to all other vehicles or vehicles of common make and model is advantageous so that the message is not readily understood by another person doing relatively little research. The vehicle's components and the positional parameters employed by these components can be chosen by the individual operator such that the correlated signal and actuation is readily apparent to that individual but not even noticeable by others. The mode and combination of positions displayed by one or more sun visor, shade, and/or tonneau cover, can be uniquely known to the authorized operator and owner of the vehicle.

In another aspect, the present teachings provide an improvement on presently available systems by requiring little power, where a small amount of power is required for the positioning but no additional power is required to maintain the position. Existing systems that present a warning continue to drain power for flashing of a light or to sound an alarm that broadcasts information to all in the surrounding area of a problem, even if the specific problem is not discernable. The subtle signal of the service level indicator described herein can indicate a problem and the degree of that problem of that level, such as a signal for a SOC that ranges from, for example, an absolute value of one to ten percent of full charge, where one component identifies the deficient component and another indicates the degree of the problem.

A sensor to the SOC of an electronic vehicle (EV), a conventional ICE vehicle's battery charge level, its fuel fill level, oil fill level, any vehicle's tire pressure, and/or the state of any necessary functional component, such as brakes, can be indicated by one component and the degree of the problem can be indicated by another component. For example, an angular position of the angle of the driver's side visor can correlate to a battery charge is low, the tire pressure of a tire is low, or the oil fill level is in a precarious state, while the angle of the passenger visor can indicate the level's relative degree, for example, that the charge is too low to start or drive the vehicle, is sufficient to start but is insufficient to allow travel to a desired destination, such as the distance to the operator's home base being a set destination, or a closest service provider identified by a map application of the vehicle's programmable output device for the deficiency that can be located via the cloud or other information service.

As indicated in FIG. 1, in an exemplary system, a sensor of the charge level 24, fuel fill level 25, oil fill level 26, tire pressure level 27, or other readily measurable property of a component transmits a signal to a control module 14 and to a processor 16. In various aspects, the transfer can occur upon stopping or parking of a vehicle. This can instruct an actuator 31a that, for example, moves the driver's visor 51a to its mid position indicating, for example, that the SOC is below that required to drive to a home base, while the actuator 31b rotates the passenger's visor 51b to indicate, for example, that 90% of the distance is perceived to be achievable by the processor when at a top, near roof, position, more than 50% when at about one third from the top position, less than 25% when at a one third from the bottom position, and less than 10% when situated at the bottom position. In another example, when the driver's visor is in the bottom position, an underinflated tire is indicated, where the passenger's visor indicates that the tire is in need of air when at mid position and that a tire is flat when at the bottom position. In a like manner, shades 52a and 52b, such as a roller shade, on the rear passenger side windows can be positioned by actuators 32a and 32b, for example, from a fully shading position, either fully up or fully down, to indicate a problem or degree of a problem. In like manner to that of the driver's visor 51a, indicated above, both driver's 51a and passenger's visor 51b can identify the component with a problem and the degree of opening of the driver's side shades 52a on both sides 52a and 52b of the vehicle can indicate the degree of problem. In this manner, the approach to the car from either side can display the desired signal to exclusively inform the operator with no ambiguity regardless of which side of the vehicle an approach is made. When the approach is from the front or back of the vehicle, noting that a single component is not in the normal rest position can inform the operator to adjust an approach such that all of the message can be deciphered. In a like manner, when the vehicle is a pickup truck, a tonneau cover, particularly when the bed is empty, can be position by an actuator 33 to an open, closed, or to degrees of closure can indicate the level deficiency that is experienced by the vehicle.

As a further security precaution, the present invention may only activate the message or promote the transmission of an additional message, when the vehicle owner or authorized operator is within the vicinity of the vehicle by using commonly carried input systems 35, such as the vehicle's existing key fob having communication functions for a remote keyless entry or employing an activation by a cell phone, tablet, or other computer application (app). By the additional message to the automatically transmitted message from the service level indicator system information to a service to attend to the low-level need can be provided to the operator. The present invention may also provide a disabling feature from an input system 34 within the vehicle, such as an onboard display with touch inputs common in most vehicles may allow the vehicle's operator to carryout onboard entry of data and can disable the system to turn OFF the feature when the vehicle is going to be parked and not plugged into a charging station for an extended period of time (e.g., on vacation, at the airport, etc.). The feature may be inherently disabled or overridden when the vehicle owner or authorized operator wishes to use the retractable cover or visor only as originally intended.

In addition to the sun visor, shade, or tonneau cover, particularly when the message activation is by a key fob or cell phone app, the system may use the vehicle lights or a display in the visor mirror, such as an e-mirror, or any existing dashboard service light, display monitors, HUD, augmented reality, or any other source to indicate which system is low or otherwise requires attention, particularly for warnings of deficiencies that are not the SOC or ICE battery charge level. The system identifier may be an icon or coded by color or frequency to notify the driver of the associated system of focus.

With reference to FIG. 1, the vehicle 10 includes a vehicle controller or vehicle control system 12, which generally includes at least one control module 14 with at least one processor 16, at least one data store or memory 18, and at least one interface system 20. The control module 14 and/or processor 16 can be a portion of a central vehicle control. In one or more aspects, the processor(s) 16 can be a main processor of the vehicle. For instance, the processor(s) 16 can be an electronic control unit (ECU). The data store 18 can include volatile and/or non-volatile memory. Examples of suitable data stores 18 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 18 can be a component of the control module 14 or processor(s) 16, or the data store 18 can be operatively connected, either directly or indirectly connected, to the processor(s) 16 for use thereby. The data store 18 may contain the algorithms or operational software 15 required to correlate the levels and the actuators.

In various aspects, the interface system 22 can be configured to work as a combination with portions that may be referred to as an input system and an output system. A remote input system 34 and/or onboard input system 35, and remote output system 36 and/or onboard output system 37 includes any device, component, element or aspect or groups thereof that enable information/data to be entered into or received from a machine. Remote systems include key fobs and cell phone applications and onboard systems are common touch activated displays common to modern vehicles. The input system can receive an input from a vehicle passenger through various known devices. An output system 36 or 37 includes any device, component, or arrangement or groups thereof that enable information/data to be presented to a vehicle passenger through various known output devices and/or displays. The input and output systems of the interface system 20 may also facilitate a coordinated operation with other systems, such as the input from sensors 24, 25, 26, and/or 27 and other vehicle systems such as a battery management system (BMS). The control module 14 can be in communication with another control module of the vehicle and output signals to actuators 31a and 31b, for the rotating of sun visors 51a and 51b or to actuators 32a and 32b to modify the position and orientation of the shades, 52a and 52b, and actuators 33 for movement of the tonneau cover (not shown).

In one or more aspects, the vehicle 10 may include one or more internal communication system 38 including at least one communication module/device 39 configured to send/receive communications between various vehicle components and vehicle systems, including the sensors 24, 25, 26, and/or 27 for input of level information concerning conditions that compromises the function of the vehicle and safety of the occupants. In various aspects, the communication module/device 38 may be configured to be able to work with wireless technology for sending/receiving communication. In various aspects, the communication system 38 may also include one or more output system devices 36, configured to receive via a receiver device 41 wireless communications from external devices, such as personal electronics devices. In other aspects, the present technology may be used with hardware and/or software located at remote locations 42. The remote location 42 may include a cloud server 43 or remote network 44 that communicates with the vehicle 10 using various known technologies, such as GPS service, cellular communication, or similar. In various aspects, a user (authorized operator or owner) may have a personal electronic device or personal communication device, such as a phone, tablet, or other smart device that can be configured to use a specific application, or "app," to communicate with at least one communication system 34/36 to remote entry or exchange data or information related to the present technology, including for example, receiving push notifications, text messages, instant messages, and the like.

The foregoing description is provided for purposes of illustration and description and is in no way intended to limit the disclosure, its application, or uses. It is not intended to be exhaustive or to limit the disclosure. Individual elements or components of a particular embodiment are generally not limited to that embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure and are not intended to limit the disclosure of the technology or any aspect thereof. The recitation of multiple embodiments having stated components is not intended to exclude other embodiments having additional components, or other embodiments incorporating different combinations of the stated components.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or components does not exclude other embodiments of the present technology that do not contain those elements or components.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A service level indicator system for a vehicle, comprising:
   at least one sensor that provides a measurement of at least one level selected from a battery charge level, a fuel fill level, an oil fill level, and a tire pressure level;
   at least one controller; and
   at least one actuator to set a position of at least one component of the vehicle selected from: a sun visor, a shade, and a tonneau cover, wherein at least one position of the component corresponds to the level, and wherein the position is viewable from an exterior of the vehicle.

2. The service level indicator system for a vehicle according to claim 1, further comprising a user input device, wherein data is input from the user input device for establishing a correlation between the at least one position and the at least one level.

3. The service level indicator system for a vehicle according to claim 2, wherein the user input device is selected from an onboard input device, a remote input device, or any combination thereof.

4. The service level indicator system for a vehicle according to claim 2, wherein the correlation comprises one or more of the at least one component and its position to indicate one of the at least one level and a degree of that level.

5. The service level indicator system for a vehicle according to claim 2, wherein the correlation is related to an absolute value of the level or is related to an anticipated range to a destination.

6. The service level indicator system for a vehicle according to claim 5, wherein the destination is a home base for the vehicle or is a discoverable nearest service provider for servicing the at least one level.

7. The service level indicator system for a vehicle according to claim 1, wherein the vehicle is an electric vehicle (EV), and the battery charge level is a state of charge (SOC) of a plurality of batteries of the EV.

8. The service level indicator system for a vehicle according to claim 1, wherein the vehicle is an internal combustion engine (ICE) vehicle, and the battery charge level is a charge level required for starting the ICE.

9. The service level indicator system for a vehicle according to claim 1, wherein the at least one component, and any position of that at least one component, is visible to an authorized operator or owner upon an approach to the vehicle from at least a driver's side of the vehicle.

10. The service level indicator system for a vehicle according to claim 1, wherein the at least one component, and any position of that at least one component, is visible to an authorized operator or owner upon an approach to the vehicle from either side of the vehicle.

11. The service level indicator system for a vehicle according to claim 1, wherein the position of the component requires no energy to maintain the position.

12. The service level indicator system for a vehicle according to claim 1, wherein the position of the component is actuated after a transmission of a signal from a key fob or an application and wherein one or more additional messages can be activated or received after the transmission.

13. A method of conveying a needed service for a vehicle, the method comprising:
    sensing at least one level selected from one or more of a battery charge level, a fuel fill level, an oil fill level, and a tire pressure level;
    correlating the at least one level with the needed service; and
    controlling at least one actuator for a translation or a rotation of at least one component of the vehicle, where the component is selected from: a sun visor, a shade, and a tonneau cover, wherein the combination of the at least one component that is actuated and a degree of actuating of the at least one component conveys a message for a need of service of vehicle.

14. The method according to claim 13, further comprising inputting to a program of a control system controlling the sensing and the actuating the at least one component associated with the level and the at least one component associated with a degree of actuation of the at least one level by the operator of the vehicle.

15. The method according to claim 13, wherein the message is viewable upon approaching the vehicle from at least a driver's side of the vehicle.

16. The method according to claim 13, wherein the message is viewable upon approaching the vehicle from either side of the vehicle.

17. A vehicle comprising a service level indicator system, comprising:
    at least one sensor that provides a measurement of at least one level selected from at least one of a battery charge level, a fuel fill level, an oil fill level, and a tire pressure level;
    at least one controller; and
    at least one actuator to set a position of at least one movable component of the vehicle, wherein the at least one movable component is selected from one or more of a sun visor, a shade, and a tonneau cover, at least one position of the at least one movable component corresponds to the at least one level, and the position is viewable from an exterior of the vehicle.

18. The vehicle comprising a service level indicator system, according to claim 17, wherein one of the at least one movable component corresponds to the at least one level and another of the at least one movable component corresponds to the degree of the level.

19. The vehicle comprising a service level indicator system, according to claim 17, further comprising a user input device, wherein data for establishing a correlation between the at least one position and the at least one level is input by an authorized operator of the vehicle.

* * * * *